US012636571B2

(12) United States Patent
Gevaert et al.

(10) Patent No.: US 12,636,571 B2
(45) Date of Patent: May 26, 2026

(54) GAMES TABLE, IN PARTICULAR FOR PLAYING BILLIARDS

(71) Applicant: DECATHLON, Villeneuve d'Ascq (FR)

(72) Inventors: Guillaume Gevaert, Villeneuve d'Ascq (FR); Denis Garit, Villeneuve d'Ascq (FR); Maxime Danel, Villeneuve d'Ascq (FR)

(73) Assignee: DECATHLON, Villeneuve d'Ascq (FR)

( * ) Notice: Subject to any disclaimer, the term of this patent is extended or adjusted under 35 U.S.C. 154(b) by 384 days.

(21) Appl. No.: 18/562,766

(22) PCT Filed: May 20, 2022

(86) PCT No.: PCT/EP2022/063784
§ 371 (c)(1),
(2) Date: Nov. 20, 2023

(87) PCT Pub. No.: WO2022/243539
PCT Pub. Date: Nov. 24, 2022

(65) Prior Publication Data
US 2024/0269540 A1 Aug. 15, 2024

(30) Foreign Application Priority Data
May 21, 2021 (FR) ...................................... 2105333

(51) Int. Cl.
A63D 15/00 (2006.01)
A47B 3/08 (2006.01)
B60B 33/00 (2006.01)

(52) U.S. Cl.
CPC ................ *A63D 15/00* (2013.01); *A47B 3/08* (2013.01); *B60B 33/0068* (2013.01); *A47B 2200/0036* (2013.01)

(58) Field of Classification Search
CPC ....................................................... A63D 15/00
(Continued)

(56) References Cited

U.S. PATENT DOCUMENTS 122,830 A * 1/1872 Heyl ...................... A63D 15/04
473/410
127,886 A * 6/1872 Hunt ...................... A63D 15/00
473/15
(Continued)

FOREIGN PATENT DOCUMENTS

| ES | 1005075 U | 10/1988 |
| FR | 2368917 A2 | 5/1978 |
| FR | 2390128 A1 | 12/1978 |

OTHER PUBLICATIONS

International Search Report for Application No. PCT/EP2022/063784, dated Sep. 26, 2022.

*Primary Examiner* — Mitra Aryanpour
(74) *Attorney, Agent, or Firm* — MARSHALL, GERSTEIN & BORUN LLP

(57) ABSTRACT

The invention relates to a games table including a base structure having an upper frame on which a table top is mounted via a mechanism for tilting about a longitudinal axis, the base structure including a floor support frame and a rolling carriage which are connected by an articulation mechanism, the table including at least one member connecting the table top and the articulation mechanism, the member being moved by the tilting of the table top while being designed to place the base structure in a stable configuration in which the support frame is arranged on the floor below the rolling carriage—or in a movement configuration in which the rolling carriage is arranged on the floor below the support frame—when the table top is in a horizontal use position—or in a raised configuration for storage.

15 Claims, 4 Drawing Sheets

(58) Field of Classification Search
USPC ............................................................. 473/4
See application file for complete search history.

(56)                    References Cited

U.S. PATENT DOCUMENTS

|  |  |  |  |  |
|---|---|---|---|---|
| 211,083 | A * | 1/1879 | Bensinger .............. | A63D 15/04 |
|  |  |  |  | 473/10 |
| 5,020,799 | A | 6/1991 | Chang |  |
| 5,056,780 | A | 10/1991 | Tsang |  |
| 6,425,835 | B1 * | 7/2002 | Kettler ................. | A47B 25/003 |
|  |  |  |  | 473/475 |
| 6,764,409 | B1 * | 7/2004 | Voden .................... | A63D 15/04 |
|  |  |  |  | 473/10 |
| 6,857,968 | B2 * | 2/2005 | Fallack .................. | A63D 15/00 |
|  |  |  |  | 473/33 |
| 8,167,732 | B2 * | 5/2012 | Tsai .......................... | A63F 7/36 |
|  |  |  |  | 473/10 |
| 2024/0269540 | A1 * | 8/2024 | Gevaert ................... | A47B 3/08 |
|  |  |  |  | 473/4 |

* cited by examiner

GAMES TABLE, IN PARTICULAR FOR PLAYING BILLIARDS

CROSS-REFERENCE TO RELATED APPLICATION

This present application is the US national phase of International Patent Application No. PCT/EP2022/063784, filed May 20, 2022, which claims priority to France Application No. FR2105333, filed May 21, 2021. The entire contents of these applications are incorporated herein by reference in their entireties.

FIELD OF THE INVENTION

The invention relates to a games table comprising a table top carrying an upper games surface, as well as a base structure on which said table top is mounted.

In particular, it applies to a games table whose upper surface is arranged for playing billiards. In particular, this table may be intended for outdoor use, the upper surface then being preferably weather-resistant.

To be able to store the games table in a small space between two uses, the document U.S. Pat. No. 5,020,799 provides a table top made in two portions which are articulated on the base structure between: a horizontal use position in continuity with each other to form the upper games surface, and a position vertically folded against each other.

Nonetheless, this storage solution is not fully satisfactory since, as set out in particular by the document EP-3 169 415, it requires the implementation of complex means to ensure continuity of the games surface which is compatible with playing billiards, in particular by closing the interface between the two portions of the table top in the horizontal position.

To solve this problem, a games table is known from the document ES-1 005 075 whose table top extends transversely on either side of a longitudinal axis while forming an upper games surface which is continuous, said table top being mounted on the base structure via a tilting mechanism about said longitudinal axis between a horizontal use position and a raised storage position.

To ensure the stability of the games table in the use position and its movement in the storage position, this prior art provides for equipping the base structure with feet and castors.

In particular, the feet may be more or less screwed beneath the base structure so as to bear on the ground during use of the games table and set back so as to retract the castors bearing on the ground to enable movement of the table in the storage position.

Nonetheless, this solution is not fully satisfactory as it is tedious to use to the extent that it requires screwing/unscrewing of each of the feet in order to ensure respectively the stability and the movement of the games table.

Furthermore, the reliability of switching from a stable use position into a movable storage position is not guaranteed to the extent that the user has to perform two distinct manipulations, on the one hand, to use/store the table by tilting the table top and, on the other hand, to stabilise/be able to move said table by unscrewing/screwing the feet.

Finally, screwing of each of the feet results in a tedious setting on the stability and of the horizontality of the games surface in order to enable use thereof in a satisfactory manner.

The invention aims to improve the prior art by providing in particular a table whose table top has a continuous games surface which is tiltable between a use position and a storage position, in which said tilting achieves simply and reliably respectively the stability of the table for use thereof and the movability thereof by rolling once stored.

To this end, the invention provides a games table comprising a table top carrying an upper games surface which extends transversely on either side of a longitudinal axis of said table top, said table comprising a base structure having an upper frame on which said table top is mounted via a tilting mechanism about said longitudinal axis between a horizontal use position and a raised storage position, said base structure comprising a frame for support on the ground and a carriage for rolling on said ground, the support frame and the rolling carriage being connected by an articulation mechanism enabling their relative movement reversibly between:

a stable configuration of the base structure in which the support frame is arranged on the ground below the rolling carriage which is arranged at a distance from said ground; and—a movement configuration of the base structure in which the rolling carriage is arranged on the ground below the support frame which is arranged at a distance from said ground; said table comprising a device for actuating the articulation mechanism, said actuating device comprising at least one member connecting the table top and the articulation mechanism, said member being moved by tilting said table top while being designed to place the base structure in a stable—respectively movement—configuration when the table top is in the use—respectively storage—position.

DESCRIPTION OF THE FIGURES

Other features and advantages of the invention will become apparent from the following description, given with reference to the appended figures, wherein.

Referring to these figures, a games table is described below comprising a table top 1 carrying an upper games surface 2 which extends transversely on either side of a longitudinal axis 18 of said table top.

In the description, the terms "longitudinal" and "transverse" are considered with respect to the axis 18, the term "longitudinal" referring to a direction parallel to this axis and the term "transverse" referring to a direction perpendicular to this axis.

In the illustrated embodiment, the table top 1 has a substantially rectangular geometry, with four rounded corners 3, carrying an upper games surface 2 which is arranged for playing billiards.

Figure 1:
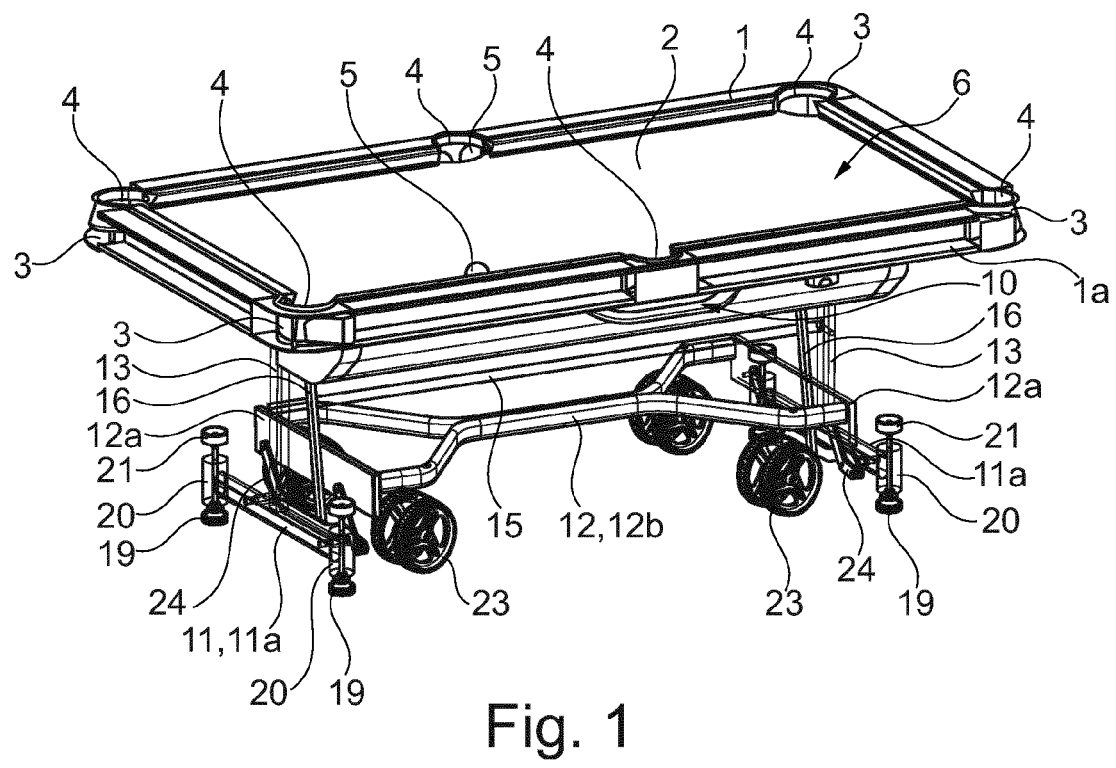
FIG. 1 schematically shows in perspective view a games table according to an embodiment of the invention, the table top being in the use position with the base structure in the stable configuration.

In particular, the table top 1 has six holes 4 which are evenly distributed along its periphery, arranged in each corner 3 and at the middle of each longitudinal edge of said table top, said holes being arranged so as to collect billiards balls 5, as shown in FIG. 1. Moreover, the games surface 2 is covered with a slate 6 which may have markings and/or patterns adapted to billiards.

In a variant that is not shown, the upper games surface 2 may be arranged for playing another game and/or sport type, for example a tennis table or a set of pucks.

Advantageously, the table is suitable for outdoor use, for example on a terrace or in a garden. For this purpose, the table top 1 may have a honeycomb structure arranged between two layers of a polymer coating, for example made of polyethylene, in order to reinforce both the mechanical rigidity and the water resistance of said table top. Similarly, the play slate 6 may be based on a waterproof and UV-resistant textile material.

Figure 5A:
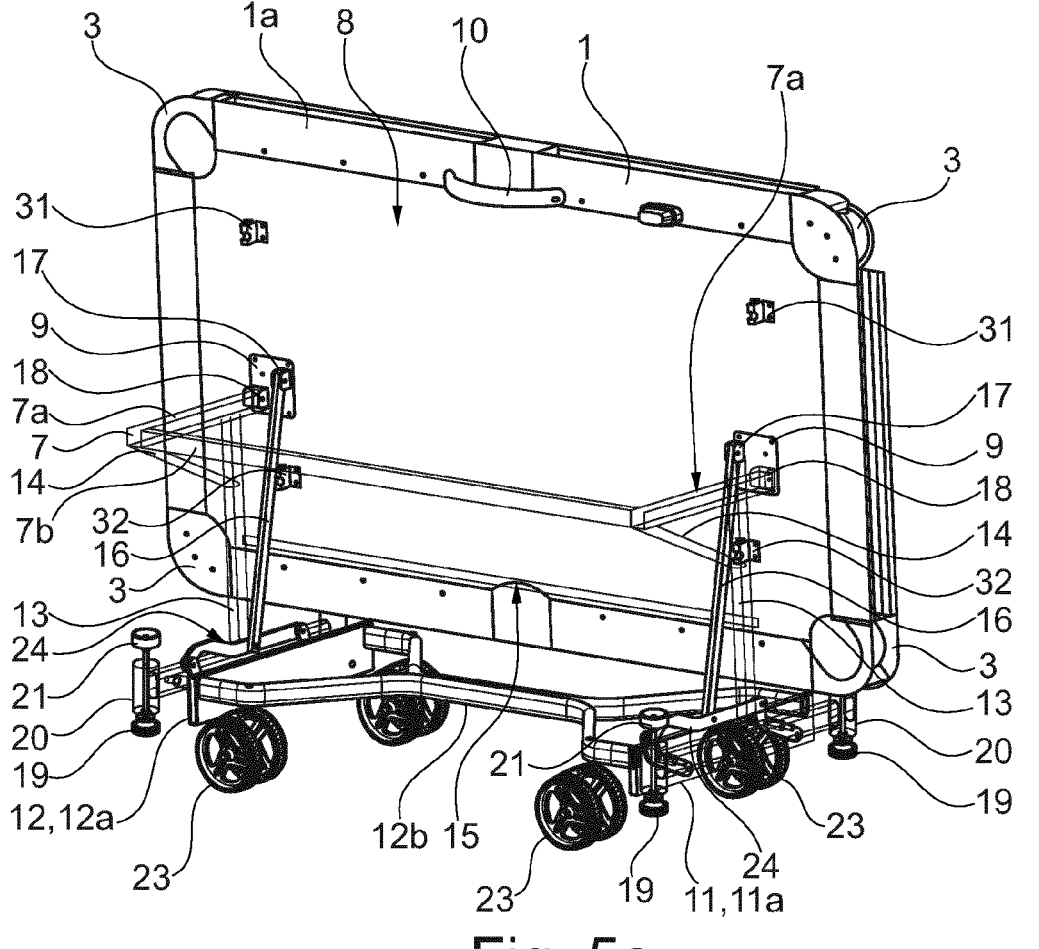
FIG. 5a and FIG. 5b show the table of the preceding figures with the table top in the storage position and the base structure in the movement configuration, respectively in perspective view (FIG. 5a) and viewed from a transverse edge of the games table top (FIG. 5b)
Figure 5B:
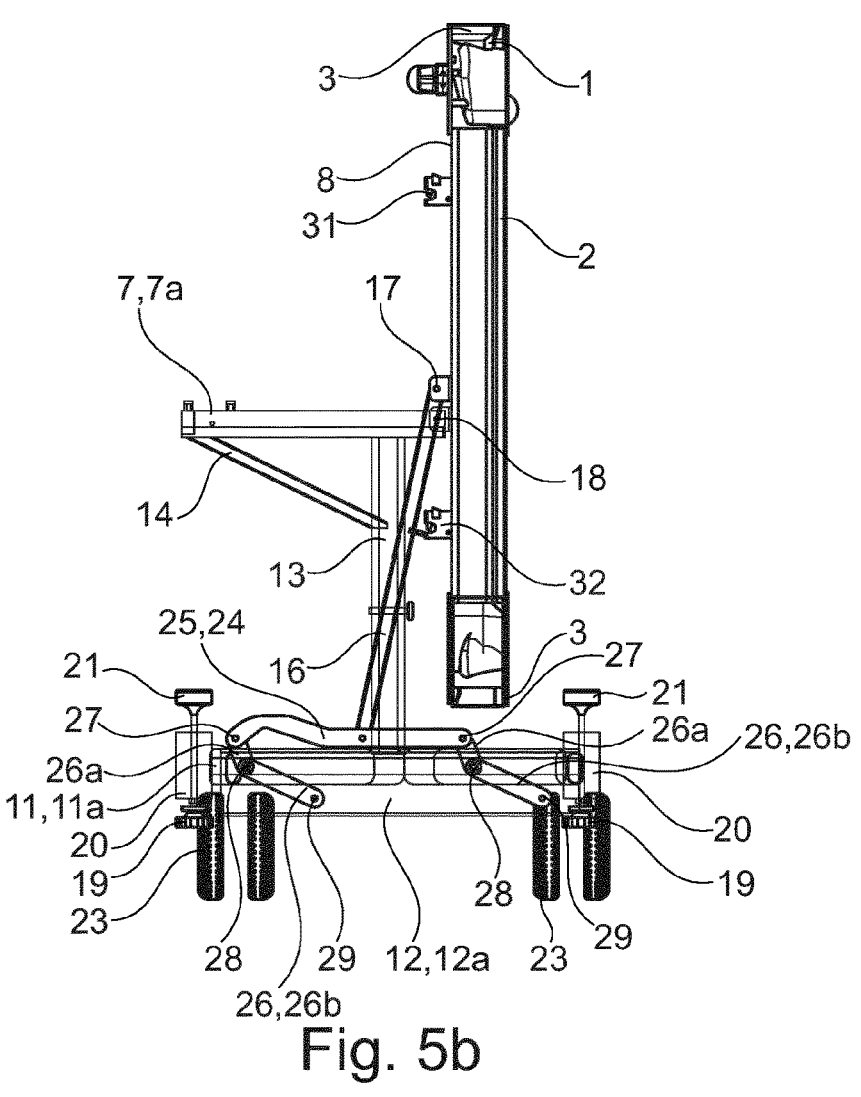
Figure 6:
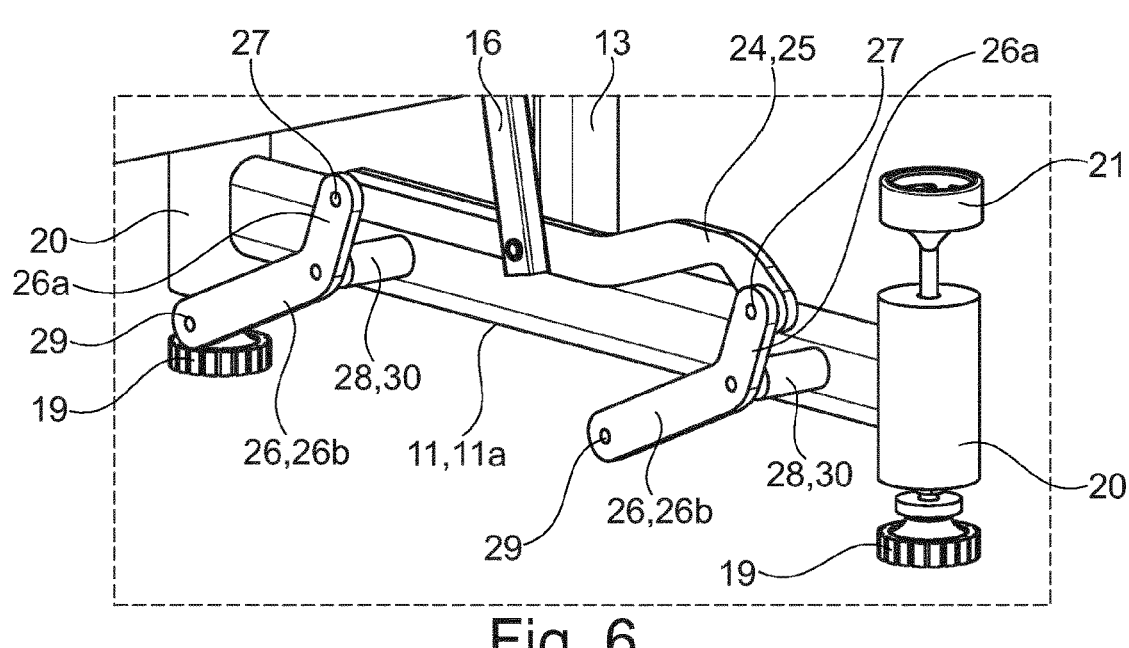
FIG. 6 is a partial zooming in perspective view of FIG. 5b showing more particularly mounting of the articulation mechanism on the support frame.

The table comprises a base structure which has an upper frame 7 on which the games table top 1 is mounted via a tilting mechanism about the longitudinal axis 18 between a horizontal use position (FIGS. 1, 3) and a raised storage position (FIGS. 5a, 5b).

In particular, the table top 1 forms an upper games surface 2 which is continuous, in particular while remaining in this state when said table top is tilted between its use and storage positions.

Opposite the games surface 2, the table top 1 has a lower surface 8 which is equipped with at least one subplate 9 rotatably mounted on the upper frame 7 to form the tilting mechanism.

In the figures, the upper frame 7 has two lateral cross-members 7a linked by a longitudinal member 7b so as to have a U-shaped configuration extending horizontally, the free ends of said cross-members being equipped with the mechanism for tilting the table top 1 between a horizontal use position bearing on the upper frame 7 and a vertical storage position perpendicular to said frame.

This configuration of the upper frame 7 allows storing the table top 1 in a vertical position with respect to the ground in order to be able to limit as much as possible the transverse dimension of the stowed table. Alternatively, in the raised storage position, the table top 1 may form an angle, for example of +/−20°, around this vertical direction.

Referring to the figures, the lower surface 8 of the table top 1 is equipped with two subplates 9 each rotatably mounted on the free end respectively of one cross-member 7a to form the tilting mechanism.

Advantageously, the table top 1 has a longitudinal edge 1a which is arranged in height in the raised position (FIG. 5a), said edge being equipped with a gripping member 10 facilitating tilting of said table top. As shown in FIGS. 1 and 5a, the gripping member 10 comprises a handle which is fastened under the lower surface 8 along the corresponding longitudinal edge 1a.

The base structure has a lower frame 11 for bearing on the ground, the upper frame 7 being linked to said support frame by two vertical posts 13. In particular, the vertical posts 13 are linked each in the vicinity of respectively one end of a cross-member 7a of the upper frame 7, each post 13 being further linked in the vicinity of the other end of said cross-member by an inclined support 14. Furthermore, each post 13 is linked directly to the end of a cross-member 7a associated with the longitudinal member 7b, and at the free end of said cross-member by the inclined support 14.

To improve the stability of the base structure, the posts 13 are linked by a horizontal retaining bar 15 which extends longitudinally between said posts, each end of said bar being fastened at mid-height on respectively one post 13.

The base structure has a rolling carriage 12 which is connected with the support frame 11 by an articulation mechanism 24 enabling the relative movement thereof reversibly between:

a stable configuration of the base structure, in which the support frame 11 is arranged on the ground below the rolling carriage 12 which is arranged at a distance from said ground (FIGS. 1, 3, 4); and—a movement configuration of the base structure, in which the rolling carriage 12 is arranged on the ground below the support frame 11 which is arranged at a distance from said ground (FIGS. 5a, 5b).

To enable tilting of the base structure from one configuration to another, the table comprises a device for actuating the articulation mechanism 24, said actuating device comprising at least one member 16, for example in the form of a connecting rod in the illustrated embodiment, connecting the table top 1 and the articulation mechanism 24, said member being moved by tilting said table top while being designed to place the base structure in a stable—respectively movement—configuration when the table top 1 is in the use—respectively storage—position.

Thus, by just and simply manipulating the tilting of the table top 1, the user simultaneously configures the base structure between its stable state of use of the games table and its state enabling movement by rolling of the stowed table. Advantageously, changing the configuration of the base structure does not modify the bearing geometry of the frame 11, which allows preserving a setting of said frame conferring stability and horizontality on the games surface 2.

In the illustrated embodiment, the actuating device comprises two members 16 each mounted proximate to respectively one vertical post 13, each member 16 having an upper end which is rotatably mounted under the table top 1 according to a longitudinal axis of rotation 17 which is offset from the tilt axis 18 to cause a movement of the members 16 by tilting said table top.

In particular, each member 16 is rotatably mounted on the adjacent subplate 9 of the table top 1 so that, in the raised storage position, the axis 17 of rotation of said member is arranged above the tilt axis 18, in order to cause a depression of the member 16 during tilting of the table top 1 in the horizontal use position.

In the figures, the support frame 11 is fixedly linked to the upper frame 7, the rolling carriage 12 being movable relative to said support frame by means of the articulation mechanism 24 between a high position and a low position to be able to reversibly place the base structure in the stable and movement configuration.

In a variant that is not shown, the carriage 12 may be fastened to the upper frame 7 and the support frame 11 may be movable by means of the articulation mechanism 24 so as to be able to modify the base structure from one configuration to another.

Each of the rolling carriage 12 and the support frame 11 has two lateral cross-members 11a, 12a which are spaced apart longitudinally, each cross-member 11a of the support frame 11 being respectively fastened to the lower end of a vertical post 13, the cross-members 12a of the carriage 12 being arranged in the longitudinal space formed between the cross-members 11a of said support frame.

The support frame 11 carries at least one foot 19 whose height is adjustable, which allows adjusting the horizontality of the games table top 1 according to the inclination of the ground on which the table is used, in particular during use of said table outdoors.

For this purpose, each of the ends of the cross-members 11a of the support frame 11 carries a module 20 in which a foot 19 is mounted by means of a manual screwing mechanism 21 which allows adapting its projection height under said frame. In particular, each mechanism 21 has an upper handle that the user can grip to perform screwing of the corresponding foot 19.

Advantageously, once screwing of the feet 19 has been performed in order to achieve stability and horizontality of the games surface 2 enabling the satisfactory use thereof, the tilting of the table top 1 and therefore the change in the configuration of the base structure have no influence on this setting.

Figure 2A:
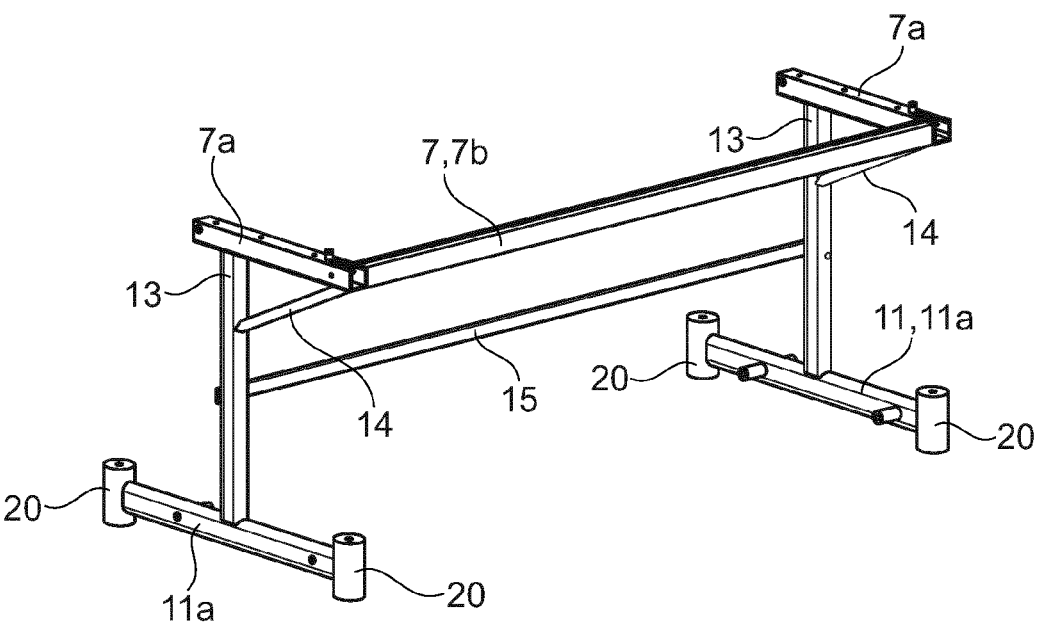
FIG. 2a and FIG. 2b each shows a portion of the base structure of the games table of FIG. 1, FIG. 2a showing the upper and ground support frames and FIG. 2b showing the carriage for rolling on the ground.
Figure 2B:
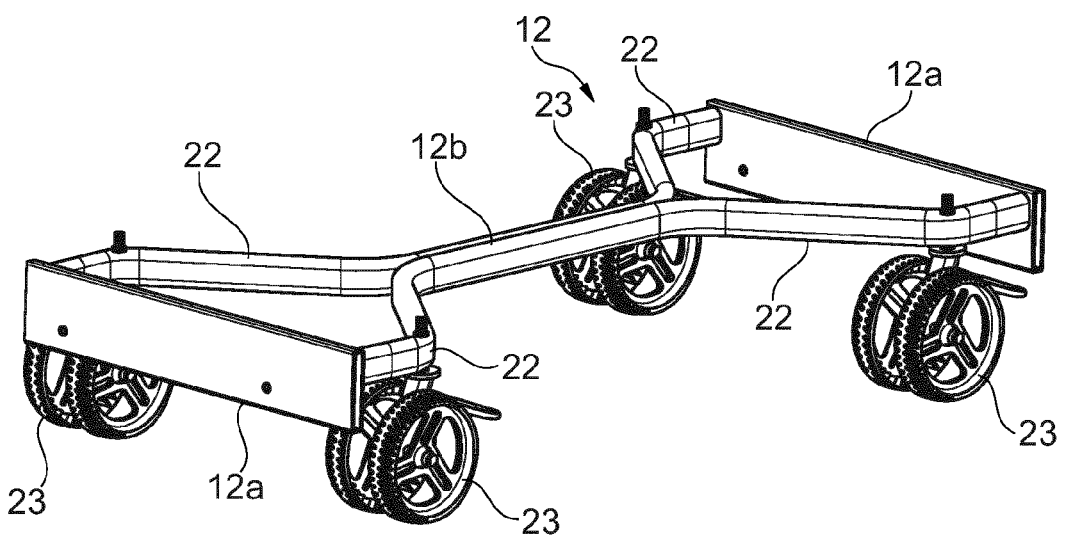

The cross-members 12a of the rolling carriage 12 are fixedly linked by at least one longitudinal member 12b, the cross-members 11a of the support frame 11 being associated respectively with a cross-member 12a of the rolling carriage 12. Referring to FIG. 2b, the carriage 12 comprises a longitudinal member 12b each end of which is split into two branches 22, the free end of each branch 22 being fastened respectively to one end of the adjacent cross-member 12a.

The rolling carriage 12 carries wheels 23 which are arranged so as to enable movement of the table by rolling on the ground. In the figures, the carriage 12 comprises four pairs of wheels 23 each of which is rotatably mounted about a vertical axis respectively on one branch 22 of the central longitudinal member 12b, in order to be able to pivot each independently about its vertical axis so as to be able to steer the table during rolling thereof on the ground.

The cross-members 11a, 12a of the support frame 11 and of the rolling carriage 12 are associated on each side respectively by an articulation mechanism 24 actuated by a member 16, each articulation mechanism 24 being arranged at the interface of said cross-members.

Referring to FIGS. 3, 4, 5b and 6, each articulation mechanism 24 comprises an actuating bar 25 on which the lower end of the adjacent member 16 is rotatably mounted, said bar having two lateral ends each carrying a connecting rod 26 in rotation according to a first longitudinal axis 27.

Each of the connecting rods 26 is rotatably mounted according to a second longitudinal axis 28 of rotation on the support frame 11 and according to a third axis 29 of rotation on the rolling carriage 12, said axes being arranged so that the movement of the bar 25 by the member 16 causes the relative movement of the rolling carriage 12 and of the support frame 11.

In particular, each actuating bar 25 extends over a transverse dimension between its lateral ends, the lower end of the member 16 being rotatably mounted in the vicinity of the central portion of said bar.

Each connecting rod 26 has a first arm 26a extending between the first axis 27 and a pivot 30 defining one amongst the second 28 and third 29 axes of rotation, and a second arm 26b extending between the pivot 30 and the other one amongst the second 28 and third 29 axes of rotation.

In the illustrated embodiment, the pivot 30 defines the second axis of rotation 28, about which the carriage 12 is movably mounted relative to the support frame 11 between the stable and movement configurations. Moreover, the arms 26a, 26b are linked by an elbow carrying the pivot 30, the second arm 26b having a length longer than the length of the first arm 26a so as to be able to profit from a lever arm effect.

Figure 3:
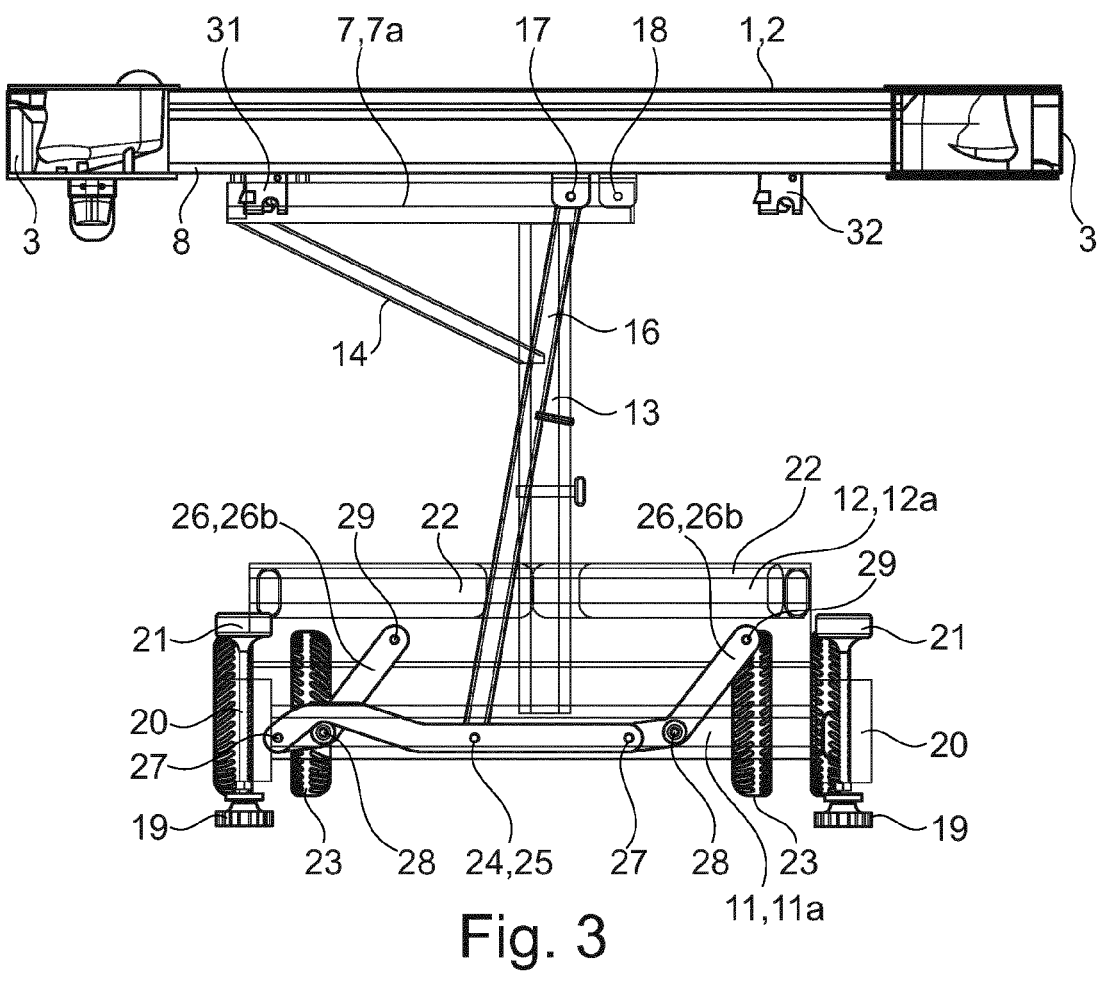
FIG. 3 is an illustration similar to FIG. 1 viewed from a transverse edge of the games table top.
Figure 4:
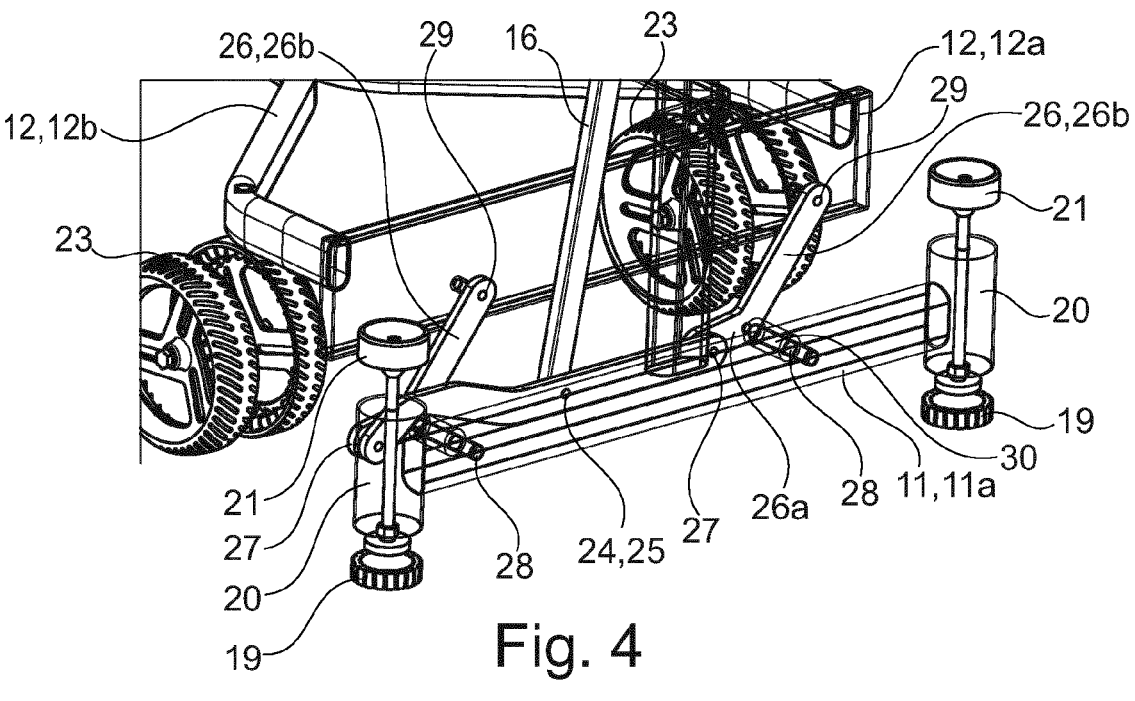
FIG. 4 is a partial zooming in perspective view of FIG. 3 showing more particularly the articulation mechanism at the interface between the support frame and the rolling carriage.

The connecting rods 26 are arranged so as to transform the movement of the member 16 into a vertical movement of the actuating bar 25, when the user tilts the table top 1 in either one of its positions, by rotation of said connecting rods about the pivot 30 to reversibly switch from a configuration in which the axis 29 carried by the second arm 26b is arranged below said pivot, corresponding to the rolling configuration (FIGS. 5b, 6), into a configuration in which said axis is arranged above said pivot, corresponding to the stable configuration (FIGS. 3, 4).

In particular, the length of the second arm 26b is arranged so as to enable a movement of the carriage 12 over a height that is large enough to ensure a good difference in height between said carriage and the support frame 11, in order to allow:

in the stable configuration, moving the wheels 23 away from the ground by a height that is large enough to avoid any contact of said wheels with said ground; and—in the rolling configuration, to move the feet 19 away from the ground by a height that is large enough to avoid said feet hindering rolling of the base structure on said ground.

The table top 1 is equipped with at least one means 31, 32 for locking in one amongst its horizontal use position or raised storage position, in order to avoid any inadvertent tilting of said table top towards the other position, in particular from the storage position into the use position.

To do this, the upper frame 7 and/or the member 16 is arranged so as to cooperate with the locking means 31, 32. In the illustrated embodiment, the lower surface 8 of the table top 1 is equipped with:

two latches 31 for locking in the horizontal position, arranged so as to reversibly engage respectively a lateral cross-member 7a of the upper frame 7 in said horizontal position; and—two latches 32 for locking in the raised position, arranged so as to reversibly engage respectively a member 16 in said raised position.

The invention claimed is:

1. A games table comprising a table top carrying an upper games surface which extends transversely on either side of a longitudinal axis of said table top, said table comprising a base structure having an upper frame on which said table top is mounted via a tilting mechanism about said longitudinal axis between a horizontal use position and a raised storage position, said base structure comprising a support frame on the ground and a carriage for rolling on said ground, said table being characterised in that the support frame and the rolling carriage are connected by an articulation mechanism enabling their relative movement reversibly between:

a stable configuration of the base structure in which the support frame is arranged on the ground below the rolling carriage which is arranged at a distance from said ground; and—a movement configuration of the base structure in which the rolling carriage is arranged on the ground below the support frame which is arranged at a distance from said ground; said table comprising a device for actuating the articulation mechanism, said actuating device comprising at least one member connecting the table top and the articulation mechanism, said member being moved by tilting said table top while being designed to place the base structure in a stable—respectively movement—configuration when the table top is in the use—respectively storage—position.

2. The games table according to claim 1, characterised in that the table top has a lower surface equipped with at least one subplate which is rotatably mounted on the upper frame to form the tilting mechanism.

3. The games table according to claim 1, characterised in that the upper frame has two lateral cross-members connected by a longitudinal member so as to have a U-shaped configuration extending horizontally, the free ends of said cross-members being equipped with the mechanism for tilting the table top between a horizontal position bearing on the upper frame and a vertical position for storage perpendicularly to said frame.

4. The games table according to claim 1, characterised in that the upper frame is linked to the support frame by two vertical posts.

5. The games table according to claim 1, characterised in that the table top is equipped with at least one locking means in one of its horizontal use position or raised storage position.

6. The games table according to claim 1, characterised in that the member has an upper end which is rotatably mounted under the table top according to a longitudinal axis of rotation which is offset from the tilt axis to cause the movement of said member by tilting said table top.

7. The games table according to claim 1, characterised in that the support frame is fixedly linked to the upper frame, the rolling carriage being movable relative to said support frame by means of the articulation mechanism between a high position and a low position to be able to set the base structure reversibly in the stable and movement configuration.

8. The games table according to claim 1, characterised in that the support frame carries at least one foot whose height is adjustable.

9. The games table according to claim 1, characterised in that the rolling carriage carries wheels which are arranged so as to enable the movement of the said table by rolling on the ground.

10. The games table according to claim 1, characterised in that each of the rolling carriage and the support frame has two lateral cross-members which are spaced apart longitudinally, the articulation mechanism being arranged at the interface of the cross-members of the support frame and of the rolling carriage.

11. The games table according to claim 10, characterised in that the cross-members of the rolling carriage are fixedly linked by at least one longitudinal member, the cross-members of the support frame being respectively associated with a cross-member of the rolling carriage.

12. The games table according to claim 1, characterised in that the articulation mechanism comprises an actuating bar on which the lower end of the member is rotatably mounted, said bar having two lateral ends each carrying a connecting rod in rotation according to a first longitudinal axis, each of said connecting rods being rotatably mounted according to a second longitudinal axis of rotation on the support frame and according to a third longitudinal axis of rotation on the rolling carriage, said axes of rotation being arranged so that the movement of the bar by the member causes the relative movement of the rolling carriage and of the support frame.

13. The games table according to claim 12, characterised in that each connecting rod has a first arm extending between the first axis of rotation and a pivot defining one amongst the second and third axes of rotation, and a second arm extending between said pivot and the other one amongst the second and third axes of rotation.

14. The games table according to claim 13, characterised in that the connecting rods are arranged so as to transform the movement of the member into a vertical movement of the actuating bar by rotation of said connecting rods about the pivot to reversibly switch from a configuration in which the axis carried by the second arm is arranged below said pivot into a configuration in which said axis is arranged above said pivot.

15. The games table according to claim 1, characterised in that the upper games surface is arranged for playing billiards.

* * * * *